(12) United States Patent
Falk

(10) Patent No.: US 11,456,879 B2
(45) Date of Patent: Sep. 27, 2022

(54) SECURE PROCESSING OF AN AUTHORIZATION VERIFICATION REQUEST

(71) Applicant: Siemens Aktiengesellschaft, Munich (DE)

(72) Inventor: Rainer Falk, Poing (DE)

(73) Assignee: SIEMENS AKTIENGESELLSCHAFT

( * ) Notice: Subject to any disclaimer, the term of this patent is extended or adjusted under 35 U.S.C. 154(b) by 451 days.

(21) Appl. No.: 16/327,213

(22) PCT Filed: Jul. 4, 2017

(86) PCT No.: PCT/EP2017/066569
§ 371 (c)(1),
(2) Date: Feb. 21, 2019

(87) PCT Pub. No.: WO2018/036701
PCT Pub. Date: Mar. 1, 2018

(65) Prior Publication Data
US 2019/0199535 A1    Jun. 27, 2019

(30) Foreign Application Priority Data
Aug. 24, 2016 (DE) .................... 10 2016 215 917.8

(51) Int. Cl.
*H04L 9/32* (2006.01)
*G06F 16/182* (2019.01)
(Continued)

(52) U.S. Cl.
CPC ........ *H04L 9/3268* (2013.01); *G06F 16/1824* (2019.01); *G06Q 20/382* (2013.01);
(Continued)

(58) Field of Classification Search
CPC ... H04L 9/0643; H04L 9/0891; H04L 9/3247; H04L 9/3268; H04L 9/0861; H04L 2209/38; G06Q 20/382; G06F 16/1824
(Continued)

(56) References Cited

U.S. PATENT DOCUMENTS 10,979,418 B2 * 4/2021 Kravitz ................ H04L 9/3268
2013/0173922 A1   7/2013 Falk et al.
(Continued)

FOREIGN PATENT DOCUMENTS

CN        102036235 A    4/2011
CN        103098414 A    5/2013
(Continued)

OTHER PUBLICATIONS

NPL Search Terms (Year: 2021).*
(Continued)

*Primary Examiner* — Syed A Zaidi
(74) *Attorney, Agent, or Firm* — Schmeiser, Olsen & Watts LLP

(57) ABSTRACT

Provided is a method for secure processing of an authorization verification request from a unit requesting authorization verification, the authorization verification request being included in a transaction of a block chain, wherein a registration entity performs a check on a block chain data structure and on the transaction protected by the block chain and, in the event of a successful check, forwards the authorization verification request to a certification entity. The authorization verification request is included in a transaction and the registration entity performs a check on a block chain data structure and on the transaction. The transaction and the authorization verification request are protected by the block chain. In particular, the authorization verification request can no longer be altered retrospectively and information that
(Continued)

Figure 1:
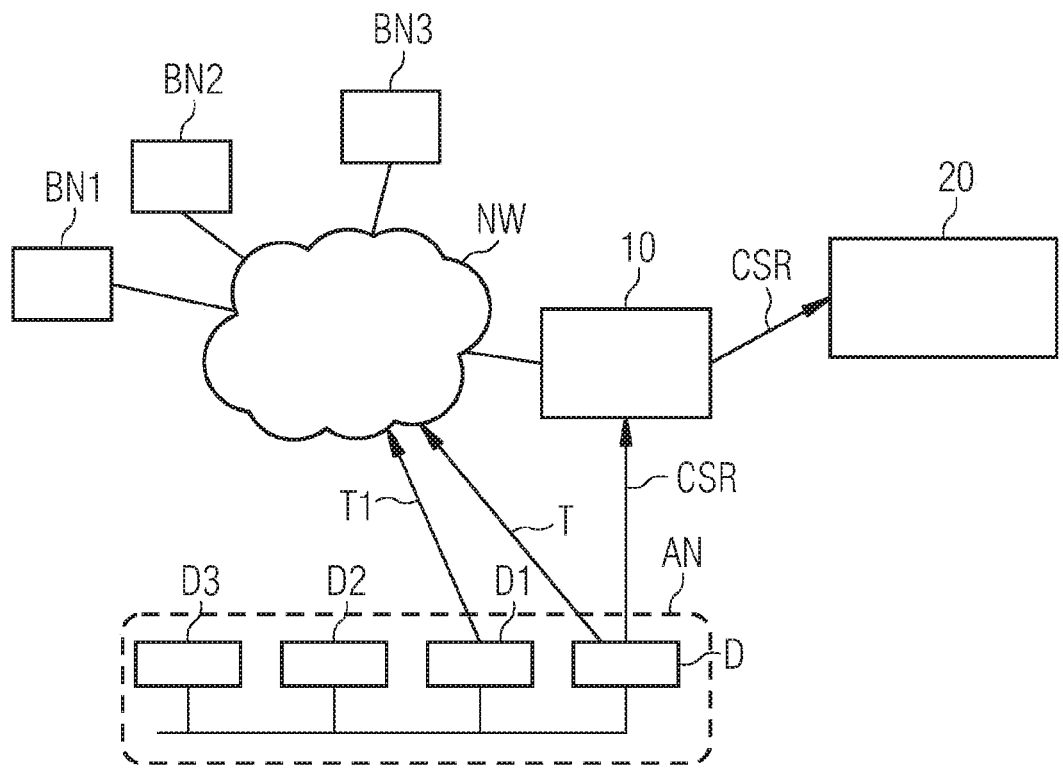

has been transmitted to the registration entity within the context of the authorization verification request is stored in the block chain and protected against manipulation.

16 Claims, 1 Drawing Sheet

(51) Int. Cl.
| | | |
|---|---|---|
| *G06Q 20/38* | (2012.01) | |
| *H04L 9/06* | (2006.01) | |
| *H04L 9/08* | (2006.01) | |
| *H04L 9/00* | (2022.01) | |

(52) U.S. Cl.
CPC .......... *H04L 9/0643* (2013.01); *H04L 9/0861* (2013.01); *H04L 9/0891* (2013.01); *H04L 9/3236* (2013.01); *H04L 9/3247* (2013.01); *H04L 9/50* (2022.05)

(58) Field of Classification Search
USPC ........................................................ 713/158
See application file for complete search history.

(56) References Cited

U.S. PATENT DOCUMENTS

| | | | |
|---|---|---|---|
| 2013/0290712 A1 | 10/2013 | Zaverucha et al. | |
| 2015/0143545 A1 | 5/2015 | Falk et al. | |
| 2016/0028552 A1 | 1/2016 | Spanos et al. | |
| 2016/0191243 A1* | 6/2016 | Manning | H04L 9/321 713/168 |
| 2016/0292672 A1* | 10/2016 | Fay | G06Q 20/3829 |
| 2017/0257358 A1* | 9/2017 | Ebrahimi | H04L 9/40 |
| 2018/0019879 A1* | 1/2018 | Kravitz | H04L 9/3236 |
| 2018/0025166 A1* | 1/2018 | Daniel | G06F 9/5011 713/189 |
| 2018/0048461 A1* | 2/2018 | Jutla | H04L 9/3236 |
| 2018/0227293 A1* | 8/2018 | Uhr | G06Q 20/223 |
| 2021/0256510 A1* | 8/2021 | Armstrong | G06Q 20/3823 |
| 2021/0314313 A1* | 10/2021 | Uhr | G06Q 20/389 |

FOREIGN PATENT DOCUMENTS

| | | |
|---|---|---|
| CN | 104322005 A | 1/2015 |
| CN | 105681047 A | 6/2016 |
| CN | 105701372 A | 6/2016 |
| CN | 105871545 A | 8/2016 |
| KR | 101637854 B1 | 7/2016 |
| WO | 2016015041 A1 | 1/2016 |
| WO | 2016128491 A1 | 8/2016 |

OTHER PUBLICATIONS

NPL Search Terms (Year: 2022).*
Longo, Riccardo et al: "0n the securi ty of the Blockchain Bix Protocol and Certificates", arxiv.org, Cornell University Library, 201 Olin Library Cornell University Ithaca, NY; 14853, XP080715457,Zusammenfassunq p. 1, line 1-p. 2, line 28, p. 6, line 1-p. 9, line 12; 2016.
Swan, Melanie: "Blockchain: Blueprint for a New Economy", O'Reilly, XP055279098, ISBN: 978-1-4919-2049-7; 2015.
Tanas, Cristian et al: "An Integrated Reward and Reputation Mechanism for MCS Preserving Users's Privacy", Network and Parallel Computing; Lecture Notes in Computer Science; Lect.Notes Computer, Springer International Publishing, Cham, pp. 83-99, XP047358358, ISSN: 0302-9743; ISBN: 978-3-540-33832-1; Zusammenfassung p. 87, line 26-p. 97, line 20; fig. 2; 2015.
PCT International Search Report and Written Opinion of International Searching Authority dated Sep. 27, 2017 corresponding to PCT International Application No. PCT/EP2017/066569 filed Apr. 7, 2017.
Non-English German Office Action for Application No. 10 2016 215 917.8, dated Apr. 28, 2017.
Web Search History; Google Scholar; Accessed May 28, 2021.
Chinese Office Action for Application No. 201780065784.8, dated Jun. 3, 2021.

* cited by examiner

SECURE PROCESSING OF AN AUTHORIZATION VERIFICATION REQUEST

CROSS-REFERENCE TO RELATED APPLICATIONS

This application claims priority to PCT Application No. PCT/EP2017/066569, having a filing date of Jul. 4, 2017, which is based on German Application No. 10 2016 215 917.8, having a filing date of Aug. 24, 2016, the entire contents both of which are hereby incorporated by reference.

FIELD OF TECHNOLOGY

The following relates to a method, to a registration entity and to a system comprising, inter alia, the registration entity for the secured processing of a proof of authorization request, wherein the proof of authorization request is contained in a transaction of a blockchain.

BACKGROUND

In industrial automation installations, security infrastructures involve proofs of authorization or security credentials, such as, for example, digital certificates, being used that are issued by certification entities or what are known as certification authorities. In this context, a device within the automation installation uses a digital certificate to identify itself to a third party. The certificate uses a signature from the certification entity to confirm that the details that the certificate contains about an identity or a public key of the device or subject are correct. Digital certificates therefore confirm, in particular, the assignment of a public key to a subject, such as, for example, a human user or device, or to a software process. The certificate can be trusted since a central certification entity is present, which all of the users participating in the security infrastructure trust. The operation of a central certification infrastructure of this kind is expensive and the costs for a certificate are therefore high. Particularly in the industrial field, several devices or processes are oriented toward a certificate-based security solution at the same time. Authentication takes place, in particular, by way of proofs of authorization or digital certificates.

Against this background, an aspect relates to design the processing of a proof of authorization request or certificate request to be more efficient and at the same time to ensure secure processing so that a proof of authorization can be issued to permissible units.

SUMMARY

Embodiments of the invention relates to a method for the secured processing of a proof of authorization request of a unit requesting a proof of authorization, wherein the proof of authorization request is contained in a transaction of a blockchain, wherein a registration entity performs a check of a blockchain data structure and of the transaction secured by means of the blockchain and, in the event of a successful check, forwards the proof of authorization request to a certification entity.

A proof of authorization request is understood in the following text to mean, for example, a certificate request or a certificate revocation request. It is, in particular, a data set in which a requesting unit confirms an identifier or identifying name or characterizing attributes and an associated public key, for example by a cryptographic checksum, such as, for example, a message authentication code or a digital signature. In particular, a certificate request comprising a subject identifier and a public key of the subject can be present as the digitally signed transaction of a blockchain. Subject generally refers to the proprietor of a certificate and of the contained public key, for example a device, identified by means of the manufacturer, the model or a serial number, a computer system with network address, IP address or URL, or a person with a name or email address.

A registration entity is understood in the following text to mean an entity that must not be trusted by users based on a particular position. It is, in particular, not a registration entity assigned to a central certification entity. It is an, in particular, decentralized apparatus, which checks and processes incoming proof of authorization requests and forwards them to the certification entity. The certification entity can be a central unit, or there can be a plurality of certification entities present in a decentralized manner. According to embodiments of the invention, by way of the blockchain, a joint infrastructure can be used for certification requests by a plurality of certification entities.

Blockchain technology performs a distributed, decentralized database in which transactions are able to be filed in a manner protected from manipulation. To this end, transactions are stored in a block. In such a blockchain data structure, in addition to one or more transactions, a hash value of a preceding block is stored. The protection is provided by a plurality of trusted nodes in a blockchain network, which performs what is known as mining or validation of blocks. In the network of nodes participating in a blockchain, a new block is formed at regular intervals, for example every 10 minutes, and in the process the hash value of an existing block is stored therewith. In this mining process, the validity of transactions to be stored in the block is checked. In addition, what is known as a cryptographic puzzle is solved, to which the mining nodes have to contribute computational capacity. The effort is rewarded, for example, through a specific payment in the cryptocurrency on which the blockchain is based. The solving of the cryptographic puzzle is also referred to as proof of work indicator. The solution of a computationally intensive task that is to be solved depending on the content of a block is proven. The chain of the block is stored in a multiplicity of blockchain nodes, and the participating nodes are synchronized. The information on the transactions is thus stored redundantly in the network.

Since all of the blocks are formed on the basis of existing blocks, since the hash value of the preceding block is inserted into a new block, a chain is formed. The transactions are thus protected against manipulation as a chain is able to be traced back to an initial block, also called genesis block, through the chaining of the blocks. As the transactions are available via the blockchain network, it is possible to trace back to which block in the chain content of a transaction no longer corresponds to the previous versions, for example. The transactions are thus stored in each verified blockchain in a manner protected against manipulation. Changing a transaction in a block that was already formed at an earlier time in the network would be able to be traced back if a checksum formation were to be traced back over the existing blocks.

Inside a blockchain network that is public and in which each node is therefore not able to be individually trusted, a block is validated by third nodes, which are located in the network and, in particular, do not carry out independent mining in particular in that a particular time is awaited after the block has been created or a certain number of blocks formed after the block until the chain is long enough that it is able to be trusted. By way of example, another chain path is formed in parallel that turns out not to be trustworthy since the multiplicity of nodes do not verify the transactions of the blocks formed therein or of a block, but rather form further blocks in the trusted longer chain. To this end, an attacker must not have more computational capacity than the rest of the blockchain together, as otherwise he could form sufficiently long chains himself more rapidly through his own fraudulent mining.

A blockchain data structure or a block comprises transaction data and at least one hash value that is formed depending on a preceding block. A chain consisting of transactions is thereby formed. Transactions that appear once in the chain are no longer changeable in an unseen manner. The transaction data relate to one transaction or a plurality of transactions. A blockchain data structure contains in particular a checksum of transaction data or these checksums and further data, such as for example a timestamp. By way of example, a checksum of transaction data that consist of a variety of transactions is formed. Cryptographic hash functions are used in particular for the checksum formation.

Through what is known as mining of the blocks for an incentive, which is formed for example by a payment in the cryptocurrency, there is an interest for the decentralized network structure to confirm blocks as being correct or to validate them, that is to say to perform mining. As long as the majority of the computational capacity in such a distributed network is free from attackers, that is to say an attacker is not able to issue more blocks through mining, in particular is able to solve more cryptographic puzzles than the trusted nodes put together, a blockchain is able to be trusted from a particular length, and in particular an individual block after a certain number of successive blocks in a path of the chain is able to be trusted.

Known blockchain systems are Bitcoin and Ethereum. Although Bitcoin was originally created for cryptocurrency transfers, Ethereum is built on the incorporation of what are called smart contracts. The conditions agreed upon in a smart contract are secured by the blockchain and the contract itself is drawn up over the network. The implementation of the contractual conditions is controlled through associated transactions that are performed, and follow-up actions provided in a programmed smart contract may be performed depending on the transaction that has taken place.

For non-public blockchain systems, blockchains are also conceivable in which mining is performed without an incentive, since for example all of the nodes are trusted.

The transaction data are inserted into the blockchain not in plain text, but rather a hash value of the transaction is formed to form the transaction data. The transaction itself is likewise available in the blockchain network. It is thus possible to verify the transaction through mining nodes or miners. The transaction in plain text is thus distributed in the network and transmitted from a device to one or more blockchain nodes.

Advantageously, the proof of authorization request is contained in a transaction and the registration entity performs a check of a blockchain data structure and of the transaction secured by means of the blockchain. The transaction and therefore the proof of authorization request are secured by the blockchain. The proof of authorization request can no longer be changed retrospectively and information that has been transmitted to the registration entity in the context of the proof of authorization request is stored in the blockchain in a manner protected against manipulation.

If the transaction has been included in the blockchain data structure owing to the mining of blocks, the information of the proof of authorization request is codified in the chain of the blockchain, at least if the blockchain exists. The transaction can then be trusted when a check of the blockchain data structure is successful, when it can be assumed, on account of the blockchain data structure existing in the blockchain network, that mining of the transaction or of the block of the transaction is legitimate or valid. This is verified based on the length of a blockchain or based on several blocks following a block with the transaction.

In the event of a successful check, the proof of authorization request is forwarded to a certification entity. The legitimacy of the proof of authorization request is provided by means of a decentralized security infrastructure. An expensive central entity, which has to verify the authorizations or information behind a request, is advantageously omitted. Instead, a computational capacity available in the network is used in a decentralized manner is used, which is used by what are known as mining nodes, to perform the mining with respect to a promised remuneration. Said mining contains the complex verification of certificate requests, which are now performed in a decentralized manner instead of a centralized manner. As an alternative, the mining is carried out with the aid of smart contracts, which are likewise distributed within the blockchain network and have been validated themselves through mining of different blocks.

Administrative processes for issuing a proof of authorization, such as a digital certificate, are significantly simplified. The complex verification of a certificate request is moved to a blockchain platform and the verification of a request by a registration entity is configured to be significantly more efficient as a result. At the same time, a security solution with certificate-based authentication can be used. Systems, installations or individual devices previously operating with digital certificates do not have to be refitted and do not have to be blockchain-enabled. It is not necessary, for example, for a device to participate directly in a blockchain platform and to store an assignment of a public cryptographic key to an identifier. On the contrary, according to the described approach, a conventional PKI security infrastructure can be used and accepted security technology, such as certificate-based authentication, can be used. Therefore, the operation of a PKI is simplified and costs for certificates are reduced at the same time. The application for a relatively low number of required certificates, for example a few tens or hundreds of required certificates, for which a public key infrastructure with a central certification entity does not pay off, is particularly advantageous. According to one configuration, the certification entity issues the proof of authorization and supplies this to a client. In this case, the client is the requesting unit and would like to obtain a proof of authorization for itself or another subject, for example an embedded system of an installation. The certification entity has the corresponding private key for the signature of the proof of authorization request. In one variant, the registration entity carries out the supplying. For example, the communication connection between a requesting device and the registration entity is used for transmitting the proof of authorization request.

Advantageously, what is known as a certificate as a service mechanism can be introduced. Certificates issued by the certification entity are, for example, limited with respect to time and transmission of a new transaction is required to regain a valid certificate. This transaction also contains the exchange of an amount of cryptocurrency so that remuneration of a blockchain-based certificate issuing can be realized. For orders of magnitude in which setting up a central certification entity that performs the verification of the requests itself is not worthwhile, issuing of a certificate can still be offered for payment. The certificate issued is adjusted to the required service life, since a certificate is no longer demanded again, for example, after a certain period.

According to one configuration, the transaction comprises information compiled by a client and associated with the proof of authorization request, attribute information. For example, an identifier or a name of a unit requesting the proof of authorization is transmitted in the information. Furthermore, for example, a public cryptographic key belonging to the requesting unit is transmitted.

According to one configuration, the check of the blockchain data structure by the registration entity comprises a verification of a blockchain length or of blocks preceding and following a checked block. A registration entity can therefore rely on the trustworthiness of transactions contained in an established blockchain. For this purpose, the chain of the blocks with the relevant transactions must have established themselves over possibly present other paths of the chain, which have been compiled, for example, by corrupt mining or by attackers. The verification by a local registration entity is therefore advantageously carried out in a very efficient manner. The complex verification of a proof of authorization request is transferred to the blockchain, which verifies the transaction with the proof of authorization request in a decentralized manner. For example, said verification is carried out with the aid of smart contracts, the security of which is in turn based on the blockchain. For example, pre-checks are carried out so that a verification of a proof of authorization request in the case of a successful pre-check is made faster. For example, this pre-check comprises the complex research of identities or roles and rights and obligations connected therewith.

According to one configuration, the check of the transaction by the registration entity comprises a verification of data in the transaction to determine whether an affiliation with the registration entity or with the certification entity associated with the registration entity can be identified. Therefore, advantageously, only the transactions and associated blockchain sections relating to the registration entity are verified. In another variant, a node can check the blockchain so that said node knows all of the valid transactions confirmed by the blockchain. Said node then filters out, for example, those transactions relating to it, for example only the most recent transaction. If the current transaction relating to it is complete and contains not only changes, it does not necessarily need the earlier transactions, for example. Other optimized methods are conceivable for identifying relevant proof of authorization requests or certificate signing requests. For example, a search is carried out heuristically. If it is known that a request is transmitted at specific times, blocks and the transactions confirmed therein located in a corresponding period can be searched in a targeted manner.

According to another configuration, a check of the transaction by the registration entity comprises a verification to determine whether, at least because of a cryptocurrency value offered in the transaction, the issuing of the proof of authorization for the requesting unit is provided by the certification entity. The issuing of a certificate is therefore coupled to how much money in cryptocurrency is offered in the request.

A smart contract can also be contained in the transaction with the proof of authorization request, said smart contract providing remuneration of the issuing certification entity. For example, for this purpose, criteria for permissible or trusted certification entities are stored. In such a scenario, the issuing of the certificate can be carried out by a plurality of certification entities. An open market for public key infrastructure services is therefore realized.

According to one configuration, in the proof of authorization request, a request is made to issue a digital certificate or a security token with a defined assignment of a subject to a cryptographic key or to issue a revocation of a digital certificate or revocation of a security token with a defined assignment of a subject to a cryptographic key. The requesting unit is, in particular, the subject itself, for example a device, or is carried out by a projection tool of an automation installation, which tool requires respective certificates for various devices. The request can relate to the issuing of certificates and to the revocation of issued certificates.

A proof of authorization or a certificate is understood to mean, in particular, an X.509 certificate, a device certificate, a user certificate or an attribute certificate. In general, it can be a security token such as, for example, a Kerberos ticket, JSON web token or SAML token, a data structure, which is confirmed by a cryptographic checksum of an issuing entity and which assigns security information, such as, for example, a public key or an attribute or an authorization or a role, to a subject. Certificate revocation information, what is known as a certificate revocation list, certificate status information, what is known as an online certificate status protocol response, OCSP response for short, or certificate validity information, what is known as a certificate white list, are generated and supplied based on the transactions of the blockchain. For example, a certificate revocation list or a certificate white list is actualized depending on the result of the check of the blockchain data structure, or an OCSP response is provided depending thereon.

In one configuration, an extension that a blockchain-based processing of the proof of authorization request has been carried out is added as information to a digital certificate issued by the certification entity or security token or to an issued revocation of a digital certificate or security token. For example, a flag is added that the certificate has been issued in a blockchain-based manner. For example, a reference to the used blockchain platform or blockchain infrastructure or a reference of the transaction used for the application or to the block containing the transaction is recorded. The process for applying for and issuing a certificate can therefore be traced and verified by third parties. Therefore, an issued certificate can be verified to determine which blockchain transactions have led to the issuing of the certificate. A trust status of the certificate can advantageously be estimated or adjusted by tags.

In one configuration, the registration entity takes further transactions, transactions with details of third parties for the reliability of a requesting unit, into account in the check of the transaction. It is therefore also possible to introduce a mechanism that, in addition to the successful check of the blockchain data structure, there also has to be a transverse confirmation, which is secured, in particular, in turn by means of the blockchain, and which confirms, for example, the trustworthiness and authorization of the requesting unit on a second route.

According to one configuration, an issue transaction of the issuing of the proof of authorization is formed and is inserted into the blockchain data structure, in particular on the basis of the issued proof of authorization. For example, a digital certificate is therefore likewise supplied as a transaction, the certification entity generates, for example, a blockchain transaction that depends on the issued certificate. The transaction may contain, for example, a uniform resource locator, URL for short, by way of which the certificate can be loaded. As an alternative, the certificate itself is contained in the transaction.

Embodiments of the invention further relates to a registration entity for the secure processing of a proof of authorization request, contained in a transaction, of a unit requesting a proof of authorization, suitable for checking a blockchain data structure and the transaction secured by means of the blockchain and for forwarding the proof of authorization request to a certification entity in the event of a successful check.

According to one configuration, the registration entity is furthermore suitable for verifying data in the transaction to determine whether an affiliation with the registration entity or with the certification entity assigned to the registration entity can be identified.

According to one configuration, the registration entity is furthermore suitable for verifying whether, at least because of a cryptocurrency value offered in the transaction, the issuing of the proof of authorization for the requesting unit is provided by the certification entity.

According to one configuration, the registration entity is furthermore suitable for generating an extension, which approves blockchain-based processing of the proof of authorization request, and for forwarding the extension to the certification entity for inclusion in an issued proof of authorization.

According to one configuration, the registration entity is furthermore suitable for taking further transactions, transactions with details of third parties for the reliability of a requesting unit, into account in the check of the transaction.

Embodiments of the invention further relates to a system comprising a registration entity according to the embodiments described above, and furthermore to a certification entity for issuing a proof of authorization and supplying the proof of authorization to a client.

According to one configuration, the registration entity or certification entity are furthermore suitable for forming an issue transaction of the issuing of the proof of authorization, with the result that the issue transaction can be inserted into the blockchain data structure, in particular on the basis of the issued proof of authorization.

The registration entity and certification entity are units that may be implemented in the form of hardware and/or also in the form of software. In an implementation in the form of hardware, the respective unit may be configured in the form of an apparatus or in the form of part of an apparatus, for example in the form of a computer or in the form of a microprocessor. In an implementation in the form of software, the respective unit may be configured in the form of a computer program product (non-transitory computer readable storage medium having instructions, which when executed by a processor, perform actions), in the form of a function, in the form of a routine, in the form of part of a program code or in the form of an executable object.

BRIEF DESCRIPTION

Figure 2:
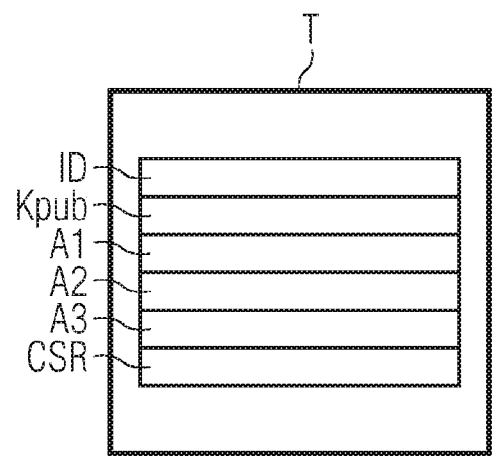

Some of the embodiments will be described in detail, with reference to the following figures, wherein like designations denote like members, wherein:

FIG. 1 shows a schematic illustration of a system composed of devices of an automation installation with a registration entity and a certification entity according to a first exemplary embodiment of the invention; and FIG. 2 shows a schematic illustration of a data structure of a transaction according to a second exemplary embodiment.

DETAILED DESCRIPTION

FIG. 1 schematically illustrates how an automation network AN, consisting of a plurality of field devices D1, D2, D3, and a device router D interact with a registration entity 10 and a certification entity 20. The registration entity 10 and one or more of the devices D1 to D3 are connected to a blockchain platform, represented by three blockchain nodes BN1, BN2, BN3, by means of a network NW. In the described example, the device D1 is intended to obtain a certificate. For this purpose, the device D1 transmits a transaction T1, which contains a proof of authorization request CSR, to the blockchain network.

In another variant, the device D1 transmits its proof of authorization request CSR, what is known as the certificate signing request, to the registration entity 10, which forwards the transaction for distribution in the blockchain network NW.

A pre-check of the device D1 advantageously takes place at a time at which a complex check is of no consequence to or does not interfere with the authorization of the device D1. By means of said pre-checks, master agreements are concluded, which confirm to the device D1 by validation in the blockchain platform certain authorizations for a certificate request in a smart contract. The transmission of the transactions takes place with the aim of achieving validation of the transactions by the blockchain, prior to a process in which a certificate is actually requested. For example, at the time at which a certificate is required by a device D1, a proof of authorization request CSR is transmitted directly to the registration entity 10 by the device D1 and the proof of authorization request contains or refers to the existing smart contract as master agreement.

In one variant, a device router D is provided in the automation installation, said router sending the certificate request messages to the registration entity 10 for one or more devices D1 to D3 and also being responsible, in particular, for the transmission of the transactions by means of the blockchain network.

The registration entity 10 checks whether transactions of the blockchain relate to said transactions themselves or to an associated certification entity 20. If said registration entity finds a valid entry with a request for a certificate that can be issued by the certification entity 20, said registration entity forwards the certificate signing request CSR contained in the transaction to the certification entity 20. This only takes place if the registration entity 10 trusts the blockchain or a section from the chain of the formed blocks relating to the transaction. The blockchain platform is the blockchain system based on Bitcoin or the platform of the Ethereum network. It is trusted that the computational capacity of the innocent miners in the blockchain exceeds a computational capacity of an attacker. If, for example, enough time is then awaited so that a chain has established itself as stable and a transaction in one of the blocks of the chain has been confirmed as valid by a sufficiently large number of nodes, the transaction is trusted.

Any further mechanisms that make it possible to perform a transverse check of the transaction or of the proof of authorization request CSR contained therein by way of the registration entity 10 can be provided to further increase the security in the system. For example, the transaction has a cryptographic checksum, which protects at least parts of the transaction. Thus for example, a digital signature, which has been signed by an operator with an associated private key, can explicitly be recorded. While this information is not considered further, for example, by blockchain nodes that perform mining, the registration entity 10 can evaluate this information for a cryptographic verification of the requesting unit. This can additionally take place and increases the security in addition to the decentralized verification.

The information supplied for the proof of authorization request CSR can be distributed over a plurality of transactions, for example a separate transaction for each attribute. For example, a separate transaction is available for confirmation of the details by a third party in the blockchain network and is a constituent part of a block, a further transaction is transmitted for the application for the certificate issuing and can be validated separately. The certification entity 20 accordingly issues the proof of authorization request CSR forwarded by the registration entity 10 to the appropriate proof of authorization. This is, for example, a certificate or a revocation of a certificate. In the described exemplary embodiment, the certification entity 20 supplies a transaction that defines the issuing of the certificate. This transaction can be forwarded, for example, from the certificate entity 20 to the blockchain network NW directly or by means of the registration entity, which is coupled to the blockchain network and receives the data of the blockchain network by means of a network connection.

The certificate is supplied, for example, by the certification entity 20 directly to the device or to the automation network or by means of the registration entity 10. The certification entity 20 and the registration entity 10 are formed as a joint unit.

For example, in an industry automation installation, at least one local registration unit, which carries out local checks of the request messages, is provided in addition to a registration entity, which receives the certificate requests of a plurality of devices. Since the complex verification by local entities is omitted in the described exemplary embodiment, the local registration entities can be canceled and only one registration entity 10 controls the certificate issuing by means of the exchange with the blockchain.

FIG. 2 depicts a transaction T according to a second exemplary embodiment of the invention. For example, the following inputs are contained in the transaction: an identifier ID is specified as "Subject: Siemens SiABC; V1.3; SN=3175438", a public key KEYPUB is specified as "Public Device Key:3A76E21876EFA03787FD629A6-5E9E990 . . . ", an encryption algorithm is specified as attributes A1, A2 and A3: "Algorithm: ECC". The following is specified as the used curve for the ECC algorithm: "Curve: brainpoolP160r1". The following is specified as Device Commissioning Identifier: "ProtectionSwitch037E". Furthermore, proof of authorization request CSR is contained as "CertificateRequest: certFormat:X.509v3; certProfile: IEC6235; CA:VerySecure".

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for the secured processing of a proof of authorization request of a unit requesting a proof of authorization, the method comprising:
   checking, by a decentralized registration entity, transactions of a blockchain for a transaction including a proof of authorization request that relates to the decentralized registration entity and/or to a certification entity associated with the decentralized registration entity,
   checking, by the decentralized registration entity, a blockchain data structure and the transaction including the proof of authorization request, wherein checking includes verifying a blockchain length and/or verifying subsequent blocks in the blockchain; and,
   in the event of a successful check, forwarding the proof of authorization request to the certification entity associated with the decentralized registration entity,
   wherein the certification entity issues the proof of authorization and supplies the proof of authorization to a client, and wherein an issue transaction of the issuing of the proof of authorization is formed and is inserted into the blockchain data structure on the basis of the issued proof of authorization.

2. The method as claimed in claim 1, wherein the transaction comprises information compiled by a client and associated with the proof of authorization request, wherein said information is an attribute, an authorization, a role or a public cryptographic key and, wherein the public cryptographic key is an identifier or name of a unit requesting the proof of authorization.

3. The method as claimed in claim 1, wherein the check of the blockchain data structure by the registration entity comprises a verification of a blockchain length or of blocks preceding and following a block to be checked.

4. The method as claimed in claim 1, wherein the check of the transaction by the registration entity comprises a verification of data in the transaction to determine whether an affiliation with the registration entity or with the certification entity associated with the registration entity is identified.

5. The method as claimed in claim 1, wherein a check of the transaction by the registration entity comprises a verification to determine whether, at least on account of a cryptocurrency value offered in the transaction, the issuing of the proof of authorization for the requesting unit is provided by the certification entity.

6. The method as claimed in claim 1, wherein, in the proof of authorization request, a request is made to issue a digital certificate or a security token with a defined assignment of a subject to a cryptographic key or to issue a revocation of a digital certificate or revocation of a security token with a defined assignment of a subject to a cryptographic key.

7. The method as claimed in claim 1, wherein the registration entity takes further transactions, wherein said further transactions are transactions with details of third parties for the trustworthiness of a requesting unit, into account in the check of the transaction.

8. The method as claimed in claim 1, wherein checking does not include a separate verification of an authorization of the request.

9. A system comprising:
   a certification entity including a hardware processor configured for issuing a proof of authorization and providing the proof of authorization to a client, and
   a decentralized registration entity including a processor configured for:

checking transactions of a blockchain for a transaction including a proof of authorization request related to the decentralized registration entity and/or to the certification entity, securely processing the proof of authorization request, checking a blockchain data structure and the transaction including the proof of authorization request, wherein checking includes verifying a blockchain length and/or verifying subsequent blocks in the blockchain, and forwarding the proof of authorization request to the certification entity in the event of a successful check, wherein at least one of the decentralized registration entity and the certification entity are configured to form an issuance transaction of the issuance of the proof of authorization, such that the issuance transaction inserted into the blockchain data structure on the basis of the issued proof of authorization.

10. The system as claimed in claim 9, furthermore suitable for verifying data in the transaction to determine whether an affiliation with the registration entity or with the certification entity assigned to the registration entity is identified.

11. The system as claimed in claim 9, furthermore suitable for verifying whether, at least because of a cryptocurrency value offered in the transaction, the issuing of a proof of authorization for the requesting unit is provided by the certification entity.

12. The system as claimed in claim 9, furthermore suitable for generating an extension, which confirms blockchain-based processing of the proof of authorization request, and for forwarding the extension to the certification entity for inclusion in an issued proof of authorization.

13. The system as claimed in claim 9, furthermore suitable for taking further transactions, wherein the further transactions are transactions with details of third parties for the trustworthiness of a requesting unit, into account in the check of the transaction.

14. The system as claimed in claim 9, wherein checking does not include a separate verification of an authorization of the request.

15. An apparatus comprising:
a decentralized registration entity including a hardware processor, wherein the decentralized registration entity is configured to:

check transactions of a blockchain for a transaction including a proof of authorization request related to the decentralized registration entity and/or to a certification entity associated with the decentralized registration entity, securely process the proof of authorization request, wherein processing includes checking a blockchain data structure and the transaction including the proof of authorization request, wherein checking includes verifying a blockchain length and/or verifying subsequent blocks in the blockchain, and forwarding the proof of authorization request to the certification entity in the event of a successful check, wherein the certification entity is configured to issue a proof of authorization, and wherein at least one of the decentralized registration entity and the certification entity are configured to form an issuance transaction of the issuance of the proof of authorization, such that the issuance transaction is inserted into the blockchain data structure on the basis of the issued proof of authorization.

16. The apparatus as claimed in claim 15, wherein checking does not include a separate verification of an authorization of the request.

* * * * *